United States Patent
Emmanuel et al.

(10) Patent No.: US 10,567,069 B2
(45) Date of Patent: Feb. 18, 2020

(54) REPEATER BANDWIDTH, RADIO CONFIGURATION, AND ADC CLOCK SPEED ADJUSTMENT

(71) Applicant: NETGEAR, Inc., San Jose, CA (US)

(72) Inventors: Joseph Amalan Arul Emmanuel, Cupertino, CA (US); Peiman Amini, Mountain View, CA (US)

(73) Assignee: NETGEAR, INC., San Jose, CA (US)

(*) Notice: Subject to any disclaimer, the term of this patent is extended or adjusted under 35 U.S.C. 154(b) by 534 days.

(21) Appl. No.: 15/141,662

(22) Filed: Apr. 28, 2016

(65) Prior Publication Data

US 2017/0317739 A1 Nov. 2, 2017

(51) Int. Cl.
*H04B 7/155* (2006.01)
*H04W 72/04* (2009.01)
*H04W 72/08* (2009.01)
*H04W 28/02* (2009.01)

(52) U.S. Cl.
CPC ...... *H04B 7/15542* (2013.01); *H04W 72/048* (2013.01); *H04W 72/082* (2013.01); *H04W 28/0215* (2013.01); *H04W 28/0236* (2013.01)

(58) Field of Classification Search
CPC .................................................. H04B 7/15542
USPC ......................................................... 370/252
See application file for complete search history.

(56) References Cited

U.S. PATENT DOCUMENTS

| | | | | |
|---|---|---|---|---|
| 7,545,867 B1* | 6/2009 | Lou | ........................ | H04L 1/0002 375/259 |
| 2002/0150117 A1* | 10/2002 | Baba | ................... | H04L 41/0896 370/442 |
| 2003/0074449 A1* | 4/2003 | Smith | ................... | H04J 3/1617 709/226 |
| 2003/0229821 A1* | 12/2003 | Ma | ........................ | G06F 1/3203 714/6.13 |
| 2004/0236547 A1* | 11/2004 | Rappaport | ............ | G06F 17/509 703/2 |
| 2005/0042999 A1* | 2/2005 | Rappaport | ............. | H04B 1/719 455/307 |
| 2006/0205342 A1* | 9/2006 | McKay, Sr. | .............. | H04B 3/36 455/11.1 |
| 2006/0215574 A1* | 9/2006 | Padmanabhan | ..... | H04L 41/0896 370/252 |

(Continued)

*Primary Examiner* — Samina F Choudhry
(74) *Attorney, Agent, or Firm* — Perkins Coie LLP

(57) ABSTRACT

In a repeater, a mechanism checks multiple parameters and makes repeater bandwidth, radio configuration, and ADC clock speed adjustments. multiple repeater parameters are checked and the repeater bandwidth is optimized based upon any of adjusting bandwidth based on best throughput; adjusting bandwidth based on Internet speed; adjusting mapping based on overlapping access points (106); adjusting bandwidth based on the client's range; adjusting ADC clock speed; adjusting transmit (TX) radio setting based on associated clients; adjusting receive (RX) radio setting based on associated clients; client type considerations; and adjusting CPU settings based on clients or backhaul. In embodiments, for example, bandwidth can be adjusted from 80 MHz to 40 MHz to 20 MHz or a smaller bandwidth, e.g. 5 MHz, for an 802.11ac/11ax/11ac device. For an 802.11n/a/b/g/ah device, bandwidth can adjusted using from 40 MHz to 20 MHz to a smaller bandwidth, e.g. 1 MHz, 2 MHz, or 5 MHz.

22 Claims, 12 Drawing Sheets

(56) References Cited

U.S. PATENT DOCUMENTS

| | | | | |
|---|---|---|---|---|
| 2011/0106969 A1* | 5/2011 | Choudhury | ...... | H04N 21/41407 |
| | | | | 709/236 |
| 2011/0187710 A1* | 8/2011 | Giovinazzi | ............ | G06T 15/00 |
| | | | | 345/419 |
| 2011/0205929 A1* | 8/2011 | Quek | .................... | H04W 16/30 |
| | | | | 370/252 |
| 2012/0230206 A1* | 9/2012 | Baliga | ................... | H04W 16/18 |
| | | | | 370/243 |
| 2015/0131758 A1* | 5/2015 | Chen | ................... | H04B 1/1027 |
| | | | | 375/340 |
| 2017/0118101 A1* | 4/2017 | Veron | ................ | H04L 43/0888 |

* cited by examiner

REPEATER BANDWIDTH, RADIO CONFIGURATION, AND ADC CLOCK SPEED ADJUSTMENT

FIELD

The invention relates to repeaters for use in communications networks. More particularly, the invention relates to repeater bandwidth, radio configuration, and ADC clock speed adjustment.

BACKGROUND

Repeaters commonly use maximum bandwidth during communications with a main access point (AP). If the repeater is close and interference is not high, using maximum bandwidth is the best choice. However, in many cases higher bandwidth degrades performance because there is 3 dB noise penalty every time the bandwidth is doubled. Thus, when bandwidth is increased the repeater is subject to greater interference.

SUMMARY

Repeaters tend to have smaller range than AP devices due to their size and thermal concerns and, as result, a drop of bandwidth is more helpful to repeaters. A larger bandwidth results in more delay variation, which is not good for real time traffic and low power devices. Embodiments of the invention provide a mechanism that checks multiple parameters and decides which bandwidth, radio configuration, and analog-to-digital converter (ADC) clock speed should be selected.

DRAWINGS

DESCRIPTION

Repeaters tend to have smaller range than AP devices due to their size and thermal concerns and, as result, a drop of bandwidth is more helpful to repeaters. A larger bandwidth results in more delay variation, which is not good for real time traffic and low power devices. Embodiments of the invention provide a mechanism that checks multiple parameters and decides which bandwidth, radio configuration, and ADC clock speed should be selected.

Figure 1:
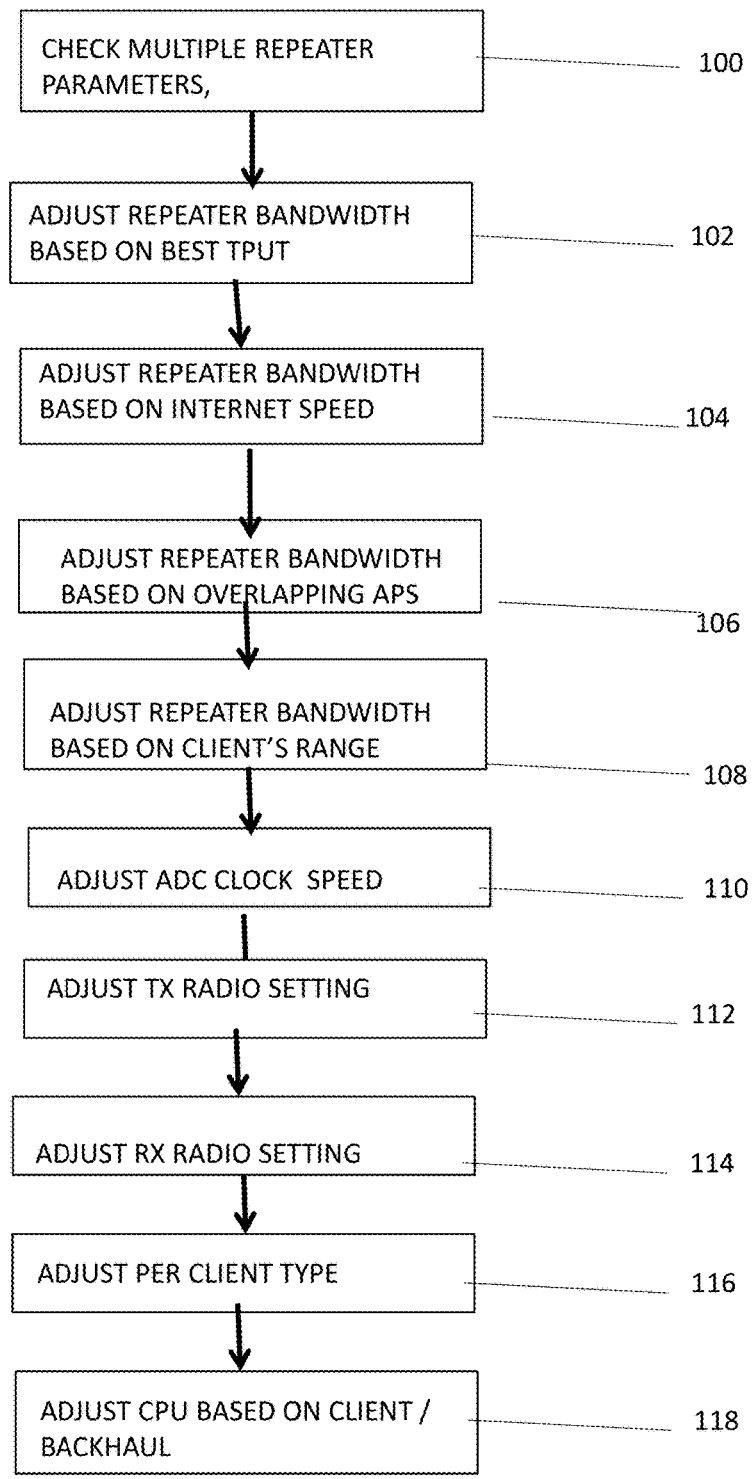
FIG. 1 is a flow diagram showing a technique for adjusting repeater bandwidth according to the invention.

FIG. 1 is a flow diagram showing a technique for adjusting repeater bandwidth according to the invention. Multiple repeater parameters are checked (100) and the repeater bandwidth is optimized based upon any of adjusting bandwidth based on best throughput (102); adjusting bandwidth based on Internet speed (104); adjusting mapping based on overlapping access points (106); adjusting bandwidth based on the client's range (108); adjusting ADC clock speed (110); adjusting transmit (TX) radio setting based on associated clients (112); adjusting receive (RX) radio setting based on associated clients (114); client type considerations (116); and adjusting CPU settings based on clients or backhaul (118).

For example, in embodiments of the invention bandwidth can be adjusted from 80 MHz to 40 MHz to 20 MHz or a smaller bandwidth, e.g. 5 MHz, for an 802.11ac/11ax/11ac device. For an 802.11n/a/b/g/ah device, bandwidth can adjusted using from 40 MHz to 20 MHz to a smaller bandwidth, e.g. 1 MHz, 2 MHz, or 5 MHz.

Adjusting Bandwidth Based on Best Throughput

Figure 11:
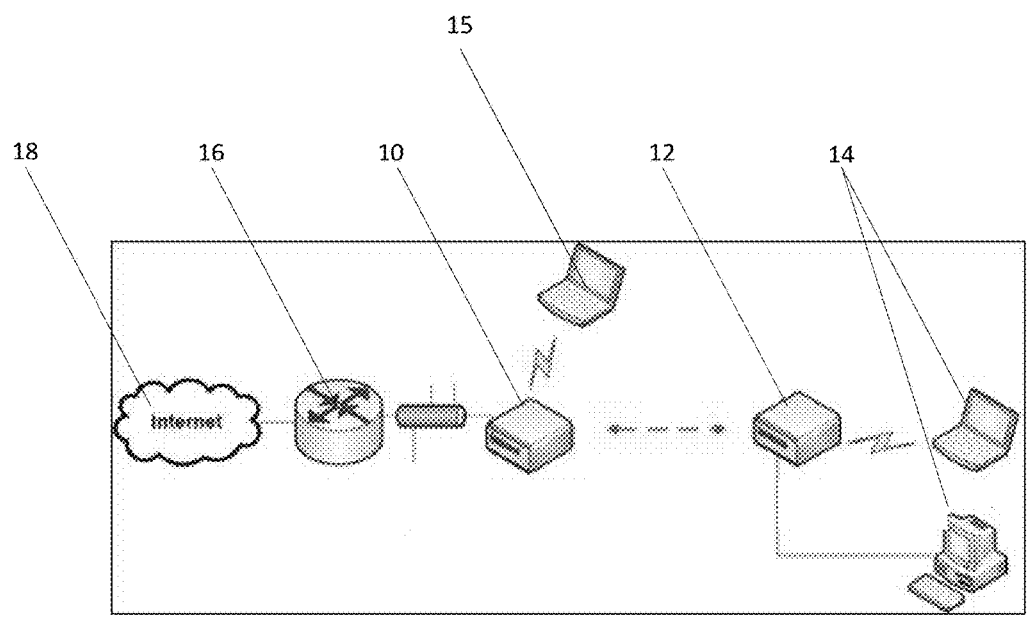
FIG. 11 is a block schematic diagram showing a network according to the invention.

Embodiments of the invention adjust bandwidth to maximize the throughput (TPUT) between a client that is associated with a repeater and a home access point (AP). See FIG. 11, which is a block schematic diagram showing a network comprising an AP 10 in direct communication with a wireless client 15 and in communication for communication to other wireless clients 14 via a repeater 12. The AP communicates with the Internet 18 via a router 16 in this embodiment of the invention, although other network arrangements are within the scope of the invention.

Figure 2:
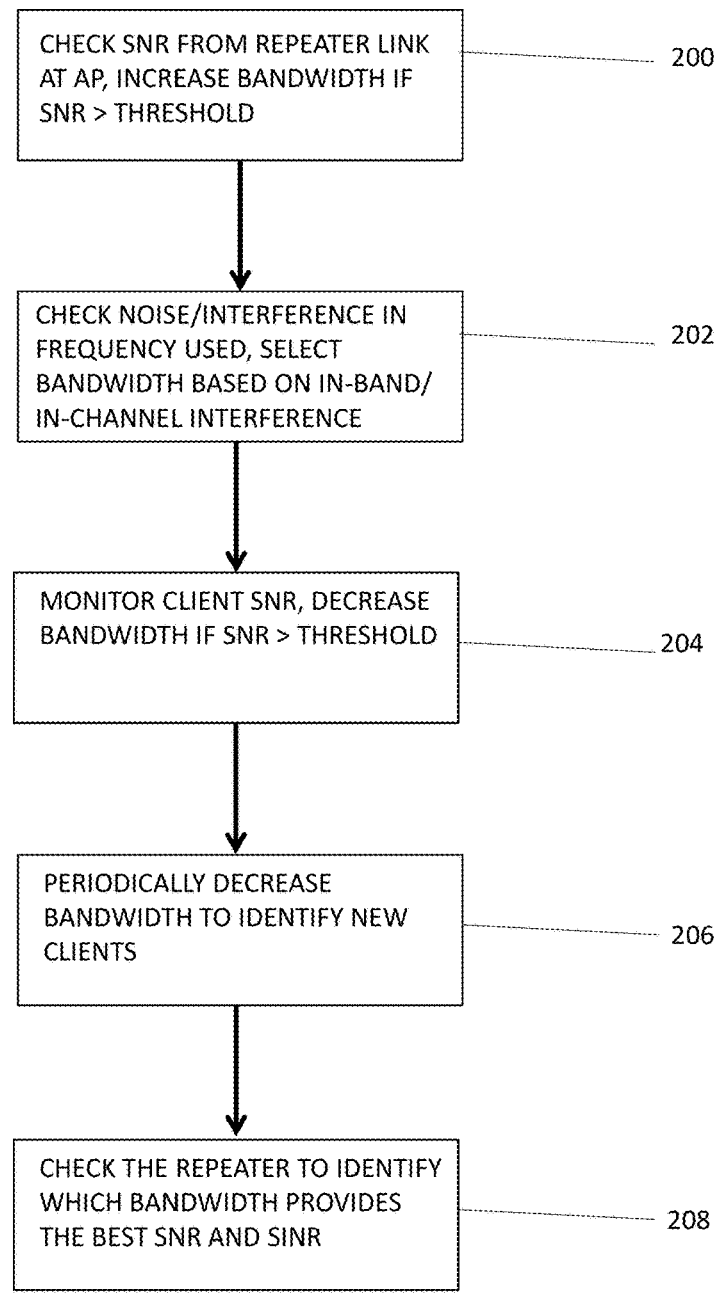
FIG. 2 is a flow diagram showing a technique for adjusting throughput based upon bandwidth according to the invention.

Embodiments of the invention test TPUT at bandwidths of 160 MHz, 80+80 MHz 80 MHz, 40 MHz, and 20 MHz to determine which bandwidth achieves the best TPUT. See FIG. 2, which is a flow diagram showing a technique for adjusting throughput based upon bandwidth. Those skilled in the art will appreciate that the steps and order of steps shown in FIG. 2 may be varied and that such variations are within the scope of the invention. For example, as shown in FIG. 2 the signal-to-noise ratio (SNR) of the access point that the repeater is connecting to may be used to see if the link to the access point is good enough for a particular bandwidth. If the SNR is higher than a predetermined threshold, a higher bandwidth may be considered (200). For example, there may be an SNR for 80+80, an SNR for 80, an SNR for 40 MHz, etc.

Moreover, the noise and interference level in the frequency of use may be monitored to see how wide of a channel can be picked without having in-channel or in-band interference (202).

Furthermore, in some scenarios, the SNR of clients associated to the radio may be monitored over time and, if the SNR does not meet the threshold of the higher bandwidth system, the bandwidth may be adjusted to lower numbers (204). Because a smaller bandwidth results in a longer range, embodiments provide a periodical change of bandwidth to smaller values to see if there is any newer client that can associate with a smaller bandwidth (206).

Embodiments check on the repeater to identify which bandwidth provides the best signal-to-noise ratio (SNR) and signal-to-noise-and-interference ratio (SINR) (208). In such embodiments, the received signal strength indication (RSSI) of the AP that the repeater is connecting to may be monitored using beacons and other frames, the noise on the channel may be measured during idle receptions, and the SNR may be calculated using this information.

Another way to measure the SNR is by using the predefined field of a packet preamble or the pilot signals during packet reception. Embodiments make this determination using a PHY level calculation on the baseband processing portion of an 802.11 chipset. The bandwidth is adjusted to limit the delay and delay jitter to support real time traffic, as opposed to providing maximum TPUT.

For example:
  If the AP is at distance that the repeater can only maintain a modulation and coding scheme 0 (MCSO) 80 MHz rate, binary phase shift keying (BPSK) rate ½ single stream, to the repeater, e.g. 32 Mbps, quadrature phase shift keying (QPSK) could be performed at 40 MHz with a coding rate of ½ or ¾ in a single stream to get 60 Mbps or 90 Mbps.
  There could be large interference in part of the 40 MHz and 80 MHz which may result in radio saturation, SNR drop, and results in retransmission, more delays etc.
  There also may be medium access issues with wide channels. When there are medium access issues, and the transmitter may need to wait for the complete channel to become available, which is harder on a wider channel than a narrower channel. The receiver may look for a narrower bandwidth and may find a clean channel where it may be clean more often. Because the channel may be clean more often, there is more chance for the transmitter to transmit, which results in less delay, jitter, etc.

Adjusting Bandwidth Based on Internet Speed

Figure 3:
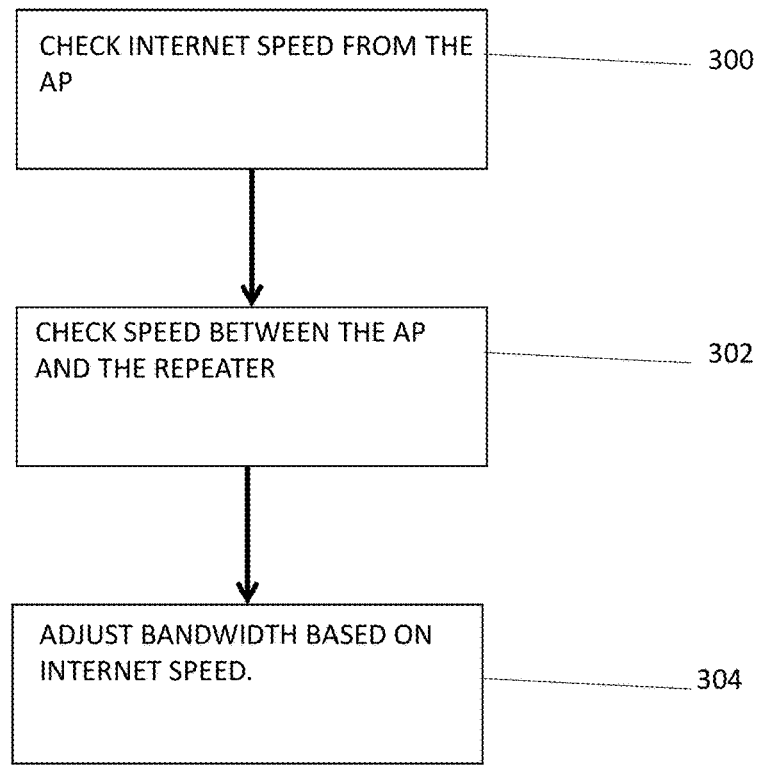
FIG. 3 is a flow diagram showing a technique for adjusting throughput based upon Internet speed according to the invention.

FIG. 3 is a flow diagram showing a technique for adjusting throughput based upon Internet speed. Internet speed is a parameter that is useful in determining the best bandwidth. A repeater cannot get the Internet access speed from the home AP if the home that the AP is from is a third party device, but the repeater can run a speed check from itself to the backbone and take Internet speed as a parameter (300). In such case, there should be a server on the Internet and the speed is measured between the AP and the repeater (302) and bandwidth is adjusted accordingly (304).

For example:
  One method downloads a file of known size and measures the time of download where speed is file size/time.
  There are standard ways by which Internet speed which can be measured (see C. Dovrolis, P. Ramanathan, D. Moore; Packet dispersion techniques and capacity estimation (Infocom 2001)).
  Path rate is a method which is used which has the following steps:
    Phase 0: Preliminary measurements and tests
    Phase I: Packet pair probing
    Phase II: Asymptotic Dispersion Rate (ADR)
  Path load is another method. Path load is a tool for estimating the available bandwidth of an end-to-end path from a host sender (S) to a host receiver (R). The available bandwidth is the maximum IP-layer throughput that a flow can get in the path from S to R, without reducing the rate of the rest of the traffic in the path.

A speed check from the repeater may not be very accurate due to wireless limitations on the repeater and wireless chip bus limitations. If the AP is a proprietary device, the repeater can ask AP for the Internet speed. If the Internet speed is known to the user, then the user can input the speed using a GUI or an app. Thus, the user can enter the Internet speed using an app or a GUI from a mobile device, PC, or other computing device. The setting can be communicated to the device using WiFi or Bluetooth. The client may be associated to home AP and it can talk to repeater from the home AP or the client may be connected directly to the repeater. If the Internet speed is not high and the environment is relatively noisy, it may be desirable to pick a smaller bandwidth.

The values for noise are calculated based on what SNR is required for a certain bandwidth to give a desired TPUT. The required SNR depends upon the receiver technology that is used on the repeater. The repeater SNR requirement may be programmed to the repeater.

The SNR required at the AP to which the repeater is connected depends on the AP receiver. The repeater can learn over time the level of noise with which the AP can receive some certain bandwidth and work well enough for that bandwidth.

Adjusting Mapping Based on an Overlapping AP

Figure 4:
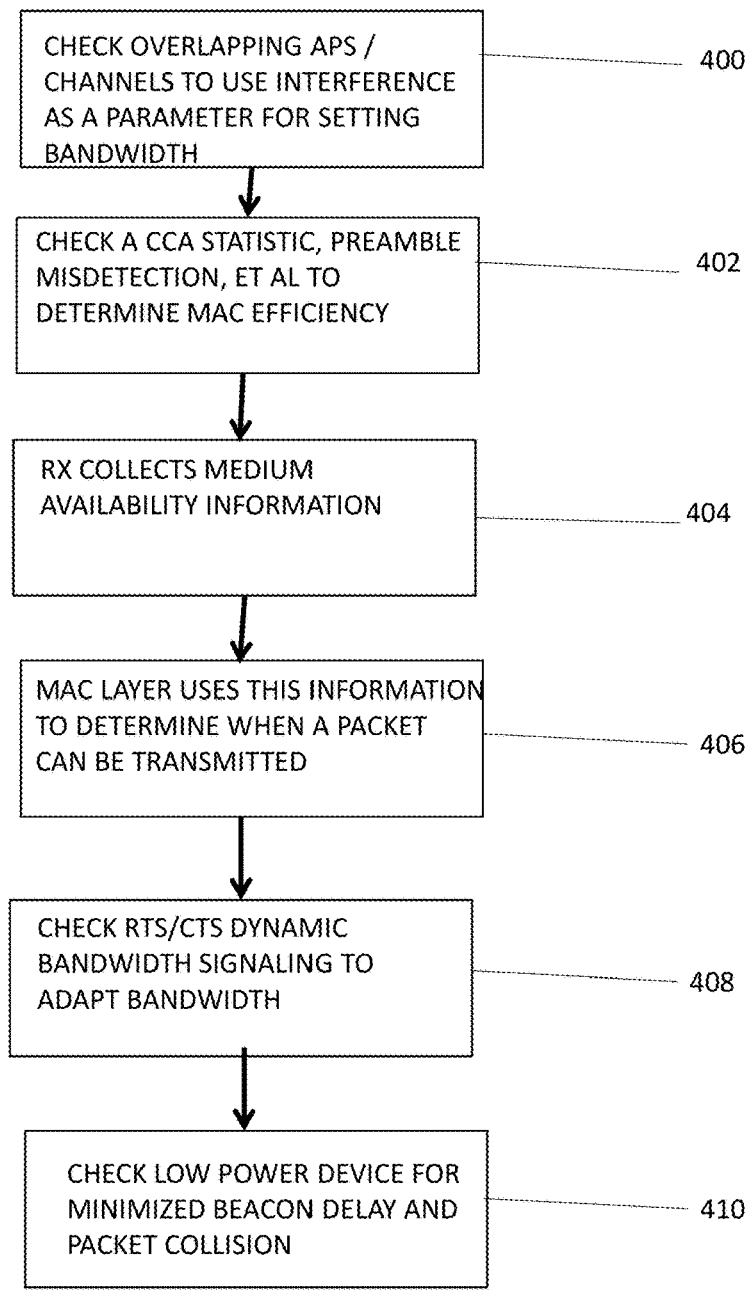
FIG. 4 is a flow diagram showing a technique for adjusting mapping based on an overlapping AP according to the invention.

FIG. 4 is a flow diagram showing a technique for adjusting mapping based on an overlapping AP. Embodiments of the invention check overlapping APs and their channel and take into account interference as a parameter that is used to select the best bandwidth (400). A canonical correlation analysis (CCA) statistic is checked, as well as preamble misdetection and others to make sure that there is not so much interference that it results in collisions and a less efficient MAC (402). The wireless receiver's chipset collects information of medium availability (404). The MAC layer uses this information to decide when it can transmit the packet (406). The layer 2 (MAC layer) usually collects this information and puts it into a form of statistics. CCA statistics are the percentage of the time that each of the sub bands of a radio is available. For example, in 80 MHz channel it is the percentage of the time that each 20 MHz sub channel is available. The receiver can use these statistics.

The request-to-send/clear-to-send (RTS/CTS) dynamic bandwidth signaling is also checked to determine which bandwidth is to be used and to adapt the bandwidth accordingly (408) Embodiments also check a low power device to determine if beacon delay and packet collision is minimized on the low power device (410).

Adjusting Bandwidth Based on the Client's Range

Figure 5:
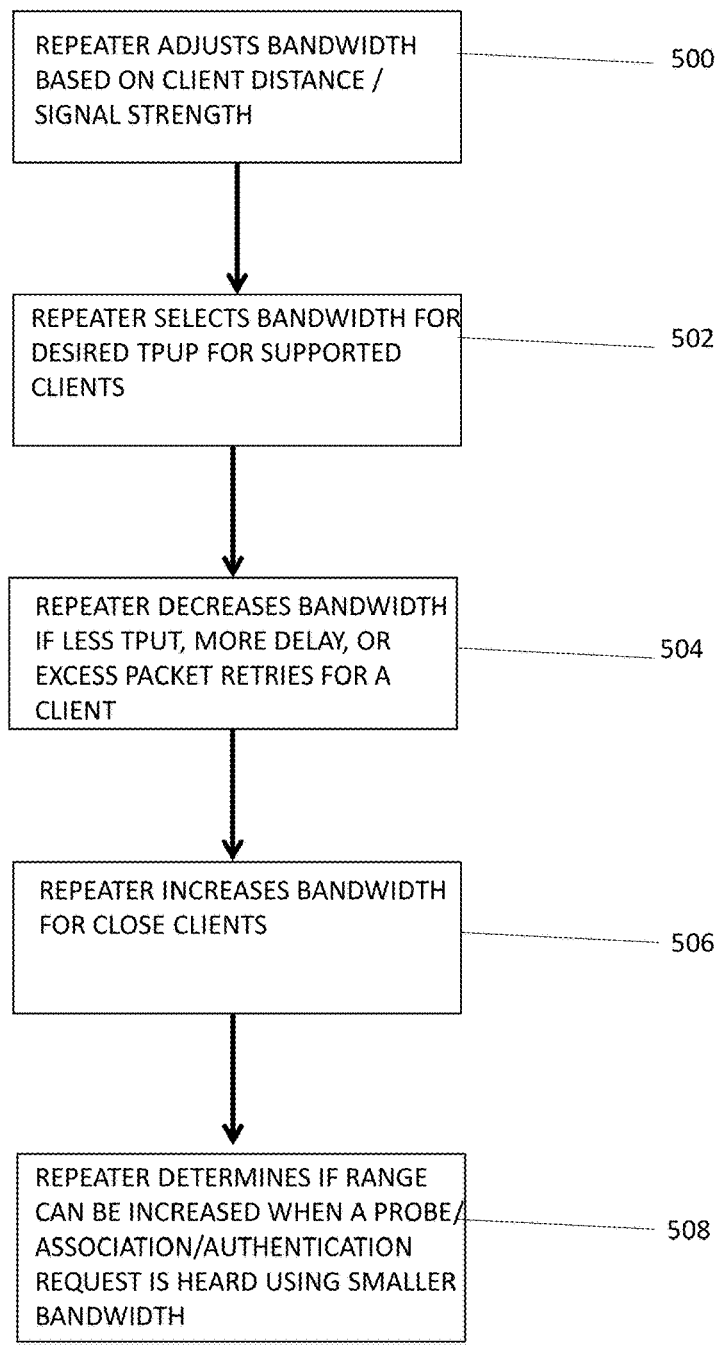
FIG. 5 is a flow diagram showing a technique for adjusting bandwidth based on the client's range according to the invention.

FIG. 5 is a flow diagram showing a technique for adjusting bandwidth based on the client's range. The repeater device may adjust the bandwidth based on the distance or signal strength of clients that associate to it (500). Once the repeater is setup and clients are associated to it, the repeater may find the bandwidth that gives it minimal desired TPUT for set of clients it supports (502). For example, if there is a client associated to repeater where the large bandwidth of the repeater results in less TPUT, more delay, or packet retries than what is desired, the repeater may drop the bandwidth (504). On the other hand, if all clients associated to repeater are in close distance the repeater may use larger bandwidth and other receiver settings which are optimized for close range clients (506). The repeater may also periodically try to see if it can hear a probe request, association request, or authentication request using smaller bandwidth which results in longer range, or using receiver settings which are optimized for longer range (508). If any new clients associate to the repeater from a longer range, the repeater may reassess the bandwidth and receiver settings for the new clients.

Adjusting ADC Clock Speed

Figure 6:
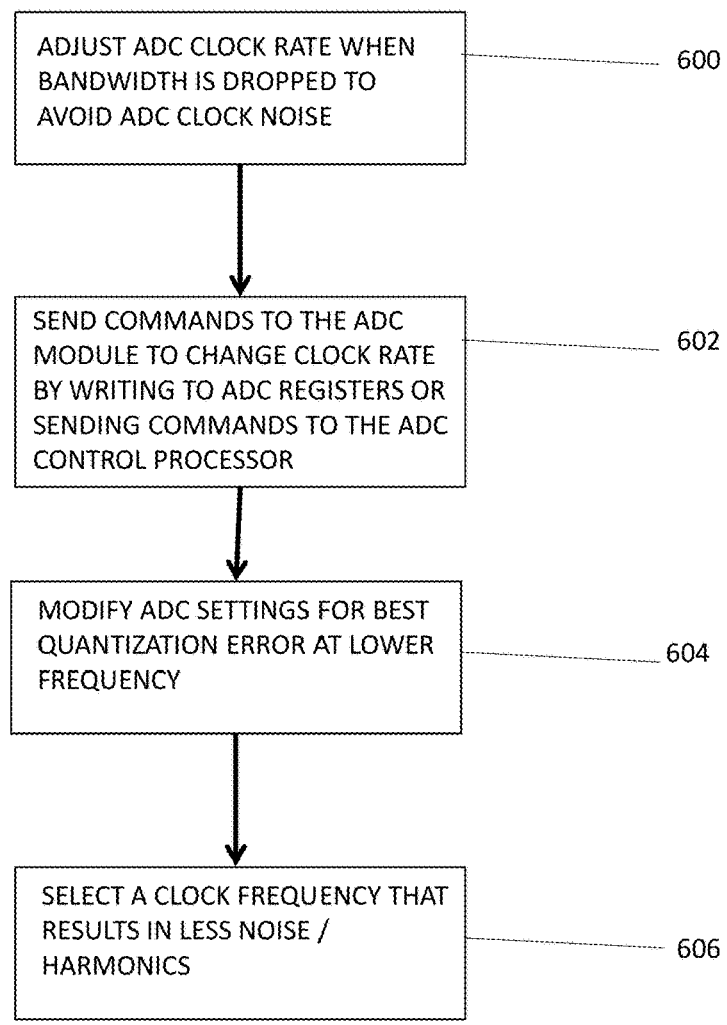
FIG. 6 is a flow diagram showing a technique for adjusting ADC clock speed according to the invention.

FIG. 6 is a flow diagram showing a technique for adjusting ADC clock speed. Embodiments of the invention adjust the ADC clock rate when the bandwidth is dropped to avoid ADC clock noise when it is applicable (600). In such embodiments, the software which runs on the communications chip or runs on the host processor which controls the communications chip may send commands to the ADC module and change the settings (602). This may be done by writing into the ADC registers, it may be done by sending commands to a base band processor which controls the ADC, or it may be done through other means.

The ADC is preferably operated in a most accurate mode where the quantization noise is minimized. For example, ADC settings may be modified to best suit the best quantization error at a lower frequency compared to higher frequency (604). ADCs usually can improve their resolution by oversampling a lower bandwidth signal and doing decimation. See, for example, AVR121: Enhancing ADC resolution by oversampling, Atmel 8-bit AVR Microcontroller, Application Note, Atmel Corporation (2005); and Improving ADC Results Through Oversampling and Post-Processing of Data, Actel Corporation (January 2007).

In some other scenarios, by dropping the ADC clock rate, power consumption is reduced and operating temperature is decreased. Embodiments adjust the ADC clock rate to avoid harmonics and cross talk, and out-of-band emissions to pass regulatory requirements at the highest power level. The designer of the WiFi solution which is used for a repeater can change the ADC frequency and look at the radio input to see if there are any harmonics based on changes to the ADC clock. If the ADC clock is creating noise or harmonics, the repeater device may chose the clock frequency which results in less harmonics or issues when it can (606). The choice of clock frequency is more important when the bandwidth of the signal is smaller.

Adjusting TX Radio Settings Based on Associated Clients

Figure 7:
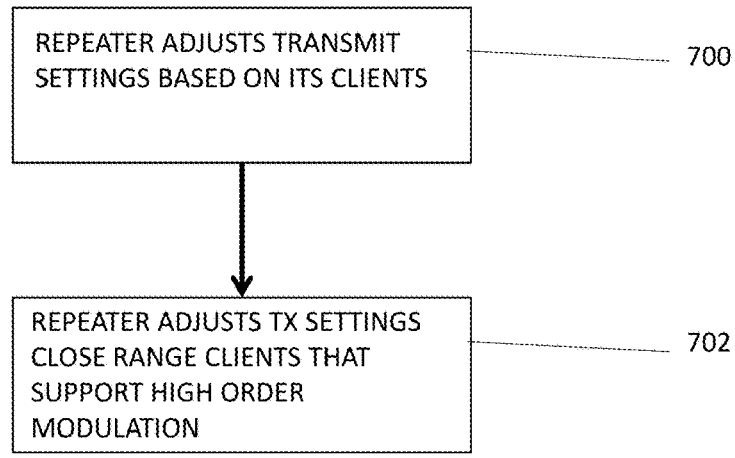
FIG. 7 is a flow diagram showing a technique for adjusting transmit (TX) radio setting based on associated clients according to the invention.

FIG. 7 is a flow diagram showing a technique for adjusting transmit (TX) radio setting based on associated clients. The repeater may adjust the transmit setting based on the clients it is servicing (700). If the clients are close-by and they support high order modulation, the repeater may use transmitter settings which are optimized for close range clients and not for far range clients (702). For example, the receiver may drop the transmit gain to get more linear amplification. If the transmitter is using power for a certain modulation, e.g. 20 dBm for 256 QAM, it may drop the transmit power to 15 dBm or 10 dBm to improve the error vector magnitude (EVM) further and increase throughput.

Adjusting other RX Radio Settings Based on Associated Clients

Figure 8:
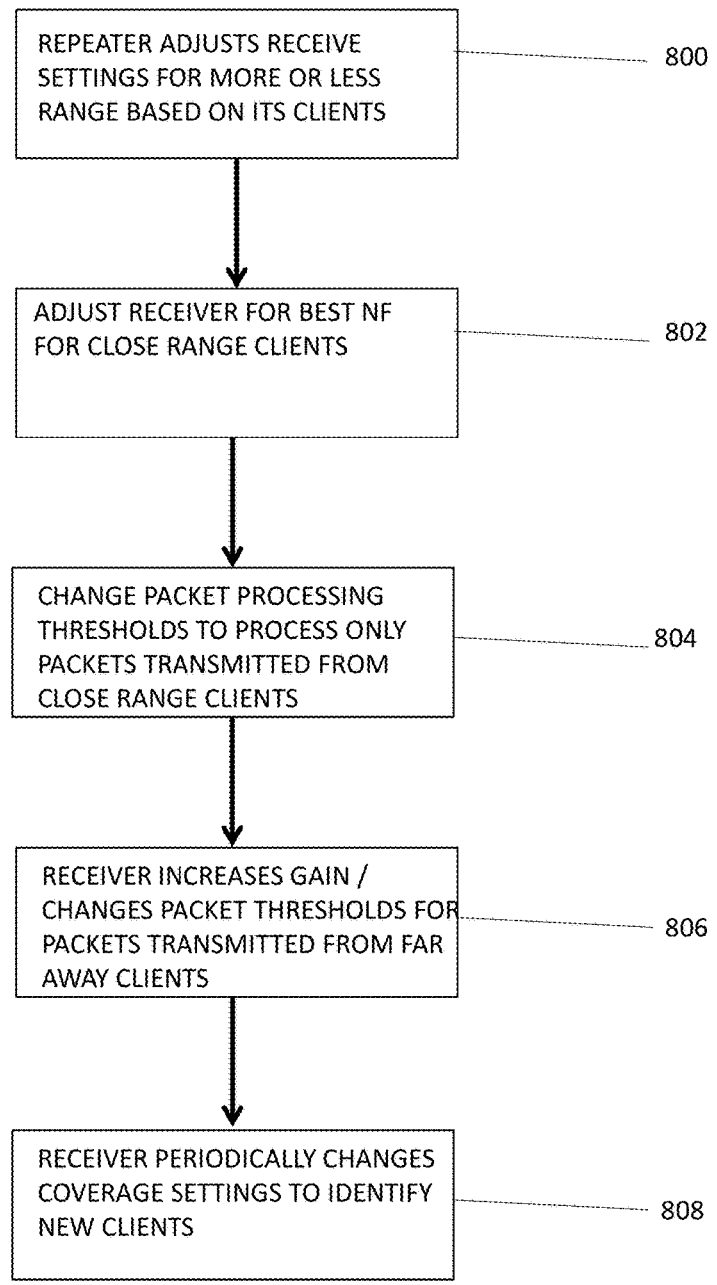
FIG. 8 is a flow diagram showing a technique for adjusting receive (RX) radio setting based on associated clients according to the invention.

FIG. 8 is a flow diagram showing a technique for adjusting receive (RX) radio setting based on associated clients. The radio receiver setting may be optimized for more or less range depending on the associated clients (800). If all clients are close by, the receiver may use settings which result in the best noise figure (NF) for close range clients (802). It may also change the packet processing thresholds so it only processes what is transmitted from close range (804). If there are clients far away the receiver may go for settings which are best for long range, i.e. more gain and/or changing packet thresholds such that it hears packets from far away clients (806). If the receiver is only processing close by clients, it may periodically change its coverage settings to see if there are any new clients that it needs to service (808).

Client Type Considerations

Figure 9:
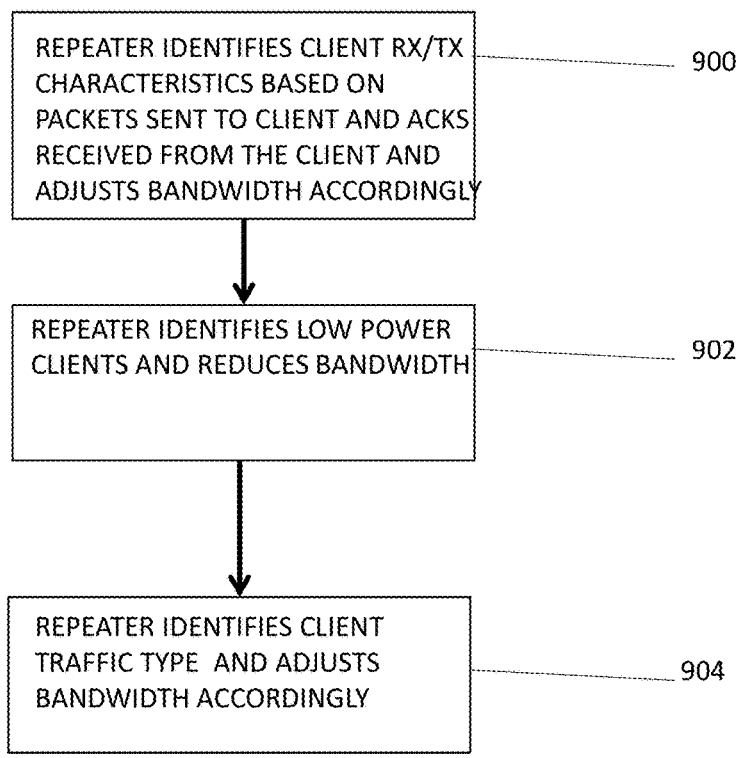
FIG. 9 is a flow diagram showing a technique for adjusting bandwidth based on client type considerations according to the invention.

FIG. 9 is a flow diagram showing a technique for adjusting bandwidth based on client type considerations. Performance of some clients is better with bandwidths of 40 MHz and 20 MHz compared to 80 MHz in some certain ranges and in some certain interference scenarios. A client having a poor receiver or transmitter may perform better in a lower bandwidth. The reason is there is less noise in the receiver and transmitter at lower bandwidths. The repeater may realize that a client has a poor transmitter or receiver based on the packets it sends to a client and the ACKs it receives, and based on the packet it receives from a certain client (900).

Moreover, there are low power clients which may have higher battery life if they receive on a lower bandwidth because they may consume less power in such case. Such low power clients may only receive or transmit small packets and thus do not require the higher data rates of higher bandwidth. The performance of clients associated with a repeater can be taken into account as a parameter when picking the bandwidth (902). Low power clients need to hear beacons on time, and the beacon timing can be taken into account for low power clients. For example, clients may indicate to the repeater or AP their power requirement during an association phase. This can be done by using fields already defined in a specification, or by using a vendor defined information element in a problem request, association request, and authentication request where the client indicates to a repeater or AP its power sensitivity.

The traffic type of a client, e.g. voice, video, background, and others, can be taken into account for bandwidth considerations (904). Low bandwidth real time traffic, e.g. VoIP, may perform better when using a smaller bandwidth because the delay jitter is smaller. Overall, audio clients require less data rate and less delay and delay variation. The data rate of an audio phone may be in the k-bit per second range while WiFi links can go as high as the G-bit per second range. However, the audio client may not be able to wait for a large bandwidth to become available because the packets are timing critical. A repeater or AP can realize the type of traffic client sent by checking the layer 2 or layer 4 priority. It may also do so by doing deep packet inspection (DPI) and classifying the type of traffic further, e.g. SKYPE call, FaceTime, Vonage service, etc.

Adjusting Supply Voltage to Power Amplifiers

In embodiments of the invention, the repeater device may adjust the supply voltage to transmit power amplifiers based on any of the needs of clients that it is servicing, the link to the AP, or other parameters. For example, 5 v, 3.3 v or other supply voltages may be used.

In some embodiments, if the transmit power can be reduced the repeater may drop the supply voltage to save power or to provide better thermal conditions for rest of the circuit by generating less heat. The decision to drop power may be made by checking the RSSI of the AP and the clients that the repeater is talking to and estimating the distance based on RSSI. If the other side of the link is close, the voltage may be dropped.

If extra transmit power is required, the higher supply voltages may be used.

Adjusting the Number of Transmit or Receive Chains

More than one transmit or receive chain are used in a multiple input multiple output (MIMO) wireless system. MIMO is used to increase data rates, improve link reliability, and overall coverage. But the use of more transmit chains may increase power consumption. Receive chains consume less power, but there is incremental power consumption as result of multiple receive chains as well.

Repeater devices are small and, as a result, thermally challenging to design. When the temperature of the RF circuit increases, performance drops. There is also unnecessary power consumption, which is a concern.

In embodiment of the invention, the repeater may have an algorithm that uses the required number of transmit or receive chains based on any of the TPUT requirement, distance of clients and AP, and the ambient or circuit temperature. The number of transmit chains used may vary from client to client, or vary when talking to the AP. The number of chains used may be decided based on any of RSSI, the number of packets sent recently, and the ACKs received.

The amount of data or TX or RX duty cycle to the other side of the link could be used as a parameter to decide the number of transmit and receive chains. If there is little data to be sent, the other side of the link does not require multiple chains for transmission and/or reception, and a lesser number of chains may be used to transmit or receive.

If there are clients that are far and need to be addressed, then more transmit and receive chains may be used. If there is a high TPUT application, more chains may be used to maximize TPUT and link reliability. If, however, the temperature exceeds a predetermined threshold, the number of chains may be dropped to aid in cooling down the repeater.

Adjusting CPU Settings Based on Clients or Backhaul

Figure 10:
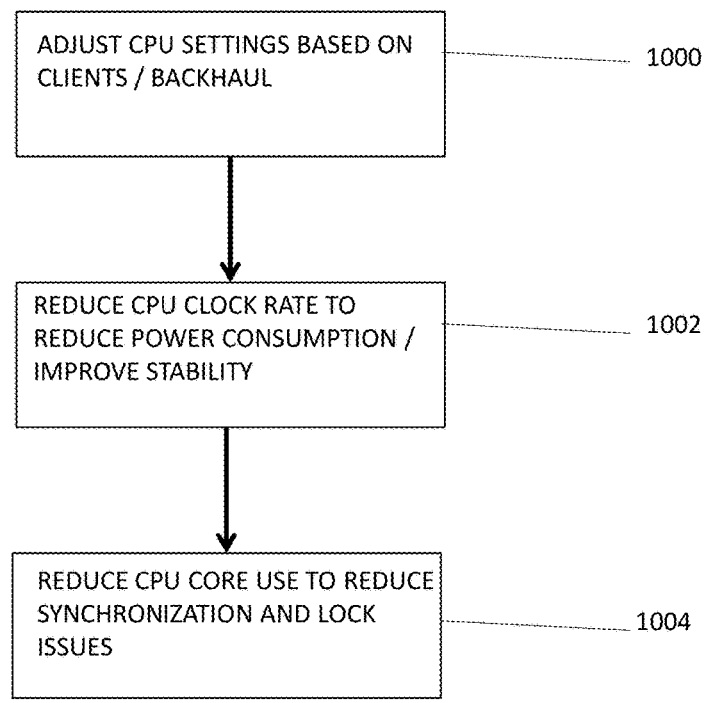
FIG. 10 is a flow diagram showing a technique for adjusting CPU settings based on clients or backhaul according to the invention.

FIG. 10 is a flow diagram showing a technique for adjusting CPU settings based on clients or backhaul (1000). The CPU clock, the number of cores a CPU uses, the cores that are used to process packets, CPU affinity to WiFi chipsets, and other parameters may change depending on type of data rates that CPU needs to support, the delay requirements, and the power consumption requirements. If all clients that are talking to the repeater are far away or sending at a low data rate, there may be no need to have the highest CPU clock. Reducing the CPU clock helps in reducing power consumption, it helps in making CPU more stable, and it avoids CPU crashes (1002).

Using multi-core CPUs helps increase performance of a system. If there is no need for using multi-cores, it is beneficial for a repeater device to shut down the CPU cores it is not using. Reducing the number of cores helps reduce the synchronization and lock issues in software that runs on multiple cores (1004). It can help reduce the race condition over memory and other resources, such as I/O. A lesser number of cores may result in less blocking on a resource, getting into an infinite loop, and system hangs, as well a reducing power consumption.

Computer Implementation

Figure 12:
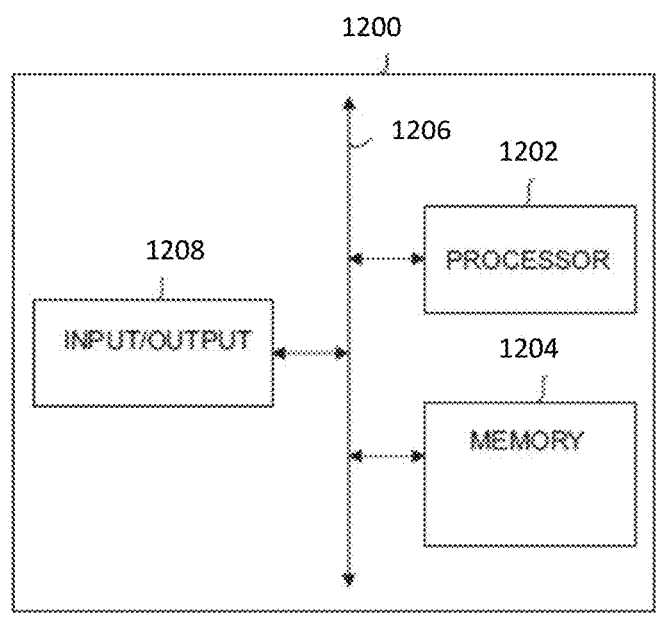
FIG. 12 is a block schematic diagram showing a machine in the example form of a computer system within which a set of instructions for causing the machine to perform one or more of the methodologies discussed herein may be executed.

FIG. 12 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 1200 may include one or more central processing units ("processors") 1202, memory 1204, input/output devices 1208, e.g. keyboard and pointing devices, touch devices, display devices, storage devices, e.g. disk drives, and network adapters, e.g. network interfaces, all of which are connected via an interconnect 1206.

In FIG. 12, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory and storage devices 1204 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 1204 can be implemented as software and/or firmware to program one or more processors to carry out the actions described above. In some embodiments of the invention, such software or firmware may be initially provided to the processing system 1200 by downloading it from a remote system through the computing system, e.g. via a network adapter.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for operation of a repeater in conjunction with an access point, comprising:
   checking multiple repeater parameters by a processor communicatively coupled with the repeater; and
   setting repeater bandwidth by the processor executing instructions in a memory, the instructions causing the processor to set repeater bandwidth based upon adjusting mapping based on overlapping access points, said adjusting mapping based on overlapping access points further comprising:
   adjusting mapping based on an overlapping AP comprising:
   checking overlapping APs and their channel;
   taking into account interference;

using interference as a parameter to select bandwidth; and checking a canonical correlation analysis (CCA) statistic and preamble misdetection to determine that interference does not result in collisions and a less efficient MAC layer.

2. The method of claim 1, further comprising:
adjusting bandwidth to maximize throughput (TPUT) between a client that is associated with a repeater and a home access point (AP) by any of:
using a signal-to-noise ratio (SNR) of the access point to which the repeater is connecting to determine if a link to the access point is adequate for a particular bandwidth, wherein when the SNR is higher than a predetermined threshold, a higher bandwidth is selected;
monitoring noise and interference level in a frequency of use to determine how wide of a channel can be selected without having in-channel or in-band interference;
monitoring the SNR of clients associated to the repeater over time, wherein when the SNR does not meet a higher bandwidth threshold, the bandwidth is reduced;
periodically reducing bandwidth to determine if there are new clients that can associate with the repeater; and
periodically checking on the repeater to identify which bandwidth provides the best SNR and signal-to-noise-and-interference ratio (SINR), wherein bandwidth is adjusted to limit delay and delay jitter to support real time traffic, as opposed to providing maximum TPUT, and wherein the SNR is calculated from any of:
both a received signal strength indication (RSSI) of the AP to which the repeater is connecting, which is monitored using beacons and other frames, and noise on a channel that is measured during idle receptions; and
a predefined field of a packet preamble or the pilot signals during packet reception using a PHY level calculation on a baseband processing portion of an 802.11 chipset.

3. The method of claim 1, further comprising:
adjusting throughput based upon Internet speed, comprising:
the repeater running a speed check from itself to a backbone and takes Internet speed as a parameter;
measuring speed between the AP and the repeater; and
adjusting bandwidth accordingly.

4. The method of claim 3, said repeater speed check further comprising:
downloading a file of known size; and
measuring a time of download, where speed is file size/time.

5. The method of claim 3, said repeater speed check further comprising:
determining path rate by preliminary measurements and tests, packet pair probing, and asymptotic dispersion rate (ADR).

6. The method of claim 3, said repeater speed check further comprising:
using path load to estimate available bandwidth of an end-to-end path from the repeater (S) to a Backbone®, wherein available bandwidth comprises the maximum IP-layer throughput that a flow can get in a path from S to R, without reducing the rate of the rest of traffic in the path.

7. The method of claim 3, said repeater speed check further comprising:
the repeater obtaining Internet speed from the AP;
the repeater receiving the Internet speed; and
the repeater selecting a smaller bandwidth when the Internet speed is low and the environment is relatively noisy.

8. The method of claim 3, further comprising:
calculating values for noise based on an SNR required for a selected bandwidth to provide a selected TPUT.

9. The method of claim 8, further comprising:
the repeater learning over time a level of noise with which the AP can properly receive at a certain bandwidth.

10. The method of claim 1, further comprising:
collecting medium availability information with a wireless receiver;
the MAC layer using said medium availability information to determine when a packet can be transmitted; and
the MAC layer collecting said medium availability information as CCA statistics for use by the receiver.

11. The method of claim 1, further comprising:
checking a request-to-send/clear-to-send (RTS/CTS) dynamic bandwidth signaling to determine which bandwidth is to be used and to adapt the bandwidth accordingly.

12. The method of claim 1, further comprising:
checking a low power device to determine if beacon delay and packet collision is minimized on the low power device.

13. The method of claim 1, further comprising:
adjusting bandwidth based on the client's range comprising:
said repeater adjusting bandwidth based on distance or signal strength of clients that associate to said client;
once the repeater is setup and clients are associated to it, said repeater finding a bandwidth that results in minimal desired TPUT for set of clients the repeater supports;
when for a client associated to repeater a large bandwidth of the repeater results in less TPUT, more delay, or packet retries than desired, the repeater dropping the bandwidth;
when all clients associated to repeater are in close distance, the repeater using a larger bandwidth and other receiver settings which are optimized for close range clients.

14. The method of claim 13, further comprising:
said repeater periodically determining if it can hear a probe request, association request, or authentication request using smaller bandwidth which results in longer range, or using receiver settings which are optimized for longer range; and
when new clients associate to the repeater from a longer range, the repeater reassessing the bandwidth and receiver settings for the new clients.

15. A computer implemented method for operation of a repeater in conjunction with an access point, comprising:
checking multiple repeater parameters by a processor communicatively coupled with the repeater; and
setting repeater bandwidth by the processor executing instructions in a memory, the instructions causing the processor to set repeater bandwidth based upon adjusting analog-to-digital converter (ADC) clock speed, said adjusting analog-to-digital converter (ADC) clock speed further comprising any of:
adjusting ADC clock speed when the bandwidth is dropped to avoid ADC clock noise by sending commands to an ADC module to change the ADC settings;
modifying ADC clock speed to reduce quantization error at a lower frequency compared to a higher frequency;
dropping ADC clock speed to reduce power consumption and operating decrease temperature;
adjusting ADC clock speed to avoid harmonics and cross talk and out-of-band emissions to pass regulatory requirements at a highest power level; and
changing ADC clock speed and examining radio input to determine if there are harmonics that are based on changes to the ADC clock speed, wherein when changes to the ADC clock speed create noise and/or harmonics, the repeater choses a clock speed which results in less noise and/or harmonics.

16. A computer implemented method for operation of a repeater in conjunction with an access point, comprising:
checking multiple repeater parameters by a processor communicatively coupled with the repeater; and
setting repeater bandwidth by the processor executing instructions in a memory, the instructions causing the processor to set repeater bandwidth based upon adjusting transmit (TX) radio setting based on associated clients, said adjusting transmit (TX) radio setting based on associated clients further comprising:
adjusting transmit (TX) radio settings based on associated clients, comprising:
the repeater adjusting a transmit setting;
when clients are close-by and support high order modulation, the repeater using transmitter settings that are optimized for close range clients and not for far range clients by dropping transmit gain for more linear amplification; and
when the transmitter is using power for a certain modulation, the transmitter dropping transmit power to improve an error vector magnitude (EVM) and increase throughput.

17. The method of claim 1, further comprising:
adjusting receive (RX) radio setting based on associated clients, comprising:
optimizing a receiver setting for more or less range depending on the associated clients;
the receiver using settings which result in the best noise figure (NF) for close range clients;
said receiver changing packet processing thresholds to process only close range transmission;
when there are clients far away, the receiver using gain and packet threshold settings which are best for long range; and
when the receiver is only processing close by clients, the receiver periodically changing its coverage settings to determine if there are any new clients that should be serviced.

18. A computer implemented method for operation of a repeater in conjunction with an access point, comprising:
checking multiple repeater parameters by a processor communicatively coupled with the repeater; and
setting repeater bandwidth by the processor executing instructions in a memory, the instructions causing the processor to set repeater bandwidth based upon adjusting bandwidth based on client type, comprising:
for a client having a poor receiver or transmitter based on packets the repeater sends to a client and the ACKs it receives, and/or based on the packets the repeater receives from a particular client, the repeater setting a lower bandwidth;
and further comprising any of:
taking performance of clients associated with the repeater into account as a parameter when picking the bandwidth;
taking beacon timing into account for low power clients, where one or more clients indicate to the repeater or AP their power requirement during an association phase by using fields already defined in a specification, or by using a vendor defined information element in a problem request, association request, and authentication request, where the client indicates to a repeater or AP its power sensitivity;
taking traffic type of a client into account for bandwidth considerations, where smaller bandwidth is used for low bandwidth real time traffic; and
the repeater or AP identifying a type of traffic client sent by checking layer 2 or layer 4 priority and/or by performing deep packet inspection (DPI) and classifying the type of traffic further.

19. The method of claim 1, further comprising:
adjusting CPU settings based on clients or backhaul, comprising:
selecting parameters for a CPU clock, a number of cores a CPU uses, cores that are used to process packets, and CPU affinity to WiFi chipsets depending on any of type of data rates to be supported by said CPU, delay requirements, and power consumption requirements;
reducing any of the CPU clock speed and number of CPU cores when all clients in communication with the repeater are far away or sending at a low data rate.

20. A computer implemented method for operation of a repeater in conjunction with an access point, comprising:
checking multiple repeater parameters by a processor communicatively coupled with the repeater; and
setting repeater bandwidth by the processor executing instructions in a memory, the instructions causing the processor to set repeater bandwidth based upon adjusting repeater transmit power amplifier supply voltage based on any of needs of clients that said repeater is servicing and a link to an access point; and
checking a received signal strength indication (RSSI) of the access point and clients that the repeater is talking to and estimating a distance based on the RSSI to determine when to drop said power amplifier supply voltage;
wherein when another side of a link is proximate to the repeater, said power amplifier supply voltage is dropped; and
wherein when extra transmit power is required, a higher power amplifier supply voltage is used.

21. A computer implemented method for operation of a repeater in conjunction with an access point, comprising:
checking multiple repeater parameters by a processor communicatively coupled with the repeater; and
setting repeater bandwidth by the processor executing instructions in a memory, the instructions causing the processor to set repeater bandwidth based upon adjusting a number of transmit or receive chains in a multiple input multiple output (MIMO) wireless system; and
determining a number of chains to be used based on any of a received signal strength indication (RSSI), a number of packets sent recently, ACKs received, and an amount of data or TX or RX duty cycle to another side of a link;

wherein when there is little data to be sent, the other side of the link does not require multiple chains for transmission and/or reception, using a lesser number of chains to transmit or receive;

wherein where there are clients that are far and need to be addressed, using more transmit and receive chains;

wherein when there is a high TPUT application, more chains are used to maximize TPUT and link reliability; and wherein when temperature exceeds a predetermined threshold, the number of chains used is dropped to aid in cooling down the repeater.

22. The method of claim 1, further comprising:

instructions causing the processor to set repeater bandwidth based upon a determined optimal throughput.

* * * * *